Figure 1:
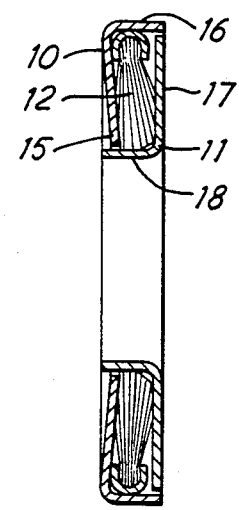

United States Patent [19]

Woodbridge et al.

[11] Patent Number: 4,541,741
[45] Date of Patent: Sep. 17, 1985

[54] SEALS FOR BEARINGS

[75] Inventors: Keith W. Woodbridge; Derrick G. Hjertzen, both of Luton, England

[73] Assignee: SKF (U.K.) Limited, Luton, England

[21] Appl. No.: 506,861

[22] Filed: Jun. 22, 1983

[30] Foreign Application Priority Data

Jun. 30, 1982 [GB] United Kingdom ............... 8218865

[51] Int. Cl.$^4$ ............................................. F16C 33/76
[52] U.S. Cl. ................................... 384/482; 384/477; 277/36; 277/95
[58] Field of Search ............... 308/187.1, 187.2; 384/140, 482, 477; 277/95, 36, 83, 53

[56] References Cited

U.S. PATENT DOCUMENTS

| | | | |
|---|---|---|---|
| 885,032 | 4/1908 | De Ferranti | 277/95 |
| 1,930,708 | 10/1933 | Cunningham | 277/95 |
| 2,009,281 | 7/1935 | Stein | 277/95 |
| 3,458,207 | 7/1969 | Conti | 277/83 |

Primary Examiner—Lenard A. Footland
Attorney, Agent, or Firm—Browdy and Neimark

[57] ABSTRACT

A sealing device for a bearing between a rotor and a shaft comprises two annular discs mounted one on the rotor and the other on the shaft, and an annular brush screen having the filaments thereof compressed transversely between annular sealing surfaces on the two discs. The outer periphery of one disc has a flange which surrounds the brush screen, and the inner periphery of the other disc has a flange which projects through the bore of the screen, the discs co-operating to form a casing which encloses and protects the brush screen. The sealing device can be mounted on one of the bearing rings of a ball bearing to form a self contained bearing assembly.

18 Claims, 12 Drawing Figures

U.S. Patent   Sep. 17, 1985   Sheet 1 of 3   4,541,741

SEALS FOR BEARINGS

This invention relates to seals for use between two relatively rotatable components, and to bearing assemblies incorporating such seals.

Conventional seals having one or more lips in rubbing contact with a sealing surface have the disadvantage that the friction torque which they exert on the components can be high and can increase to an unacceptable value in the event of a differential pressure across the seal. This phenomenon can occur for example in conveyor rollers fitted at the ends thereof with sealing lips which are in rubbing contact with a sealing surface and which are deflected by a difference in pressure across the seal onto the sealing surface. During operation of the conveyor roller, the temperature of the roller can increase due to friction and radiating heat and the resulting increase in the pressure of the air in the interior of the roller above the ambient air pressure causes the lips to lift from the sealing surface and permit escape of air. When however the roller cools down after operation, the pressure of the air in the interior of the roller falls below the ambient air pressure and the differential pressure forces the lips against the sealing surface and thereby increases the friction torque.

The object of the invention is to provide an improved construction of seal which effectively prevents passage of dirt and dust between two components but nevertheless has a low friction torque and permits a very restricted flow of air in the event of any pressure differential across the seal.

According to the present invention there is provided a seal between two relatively rotatable components, comprising an annular brush screen having the filaments thereof compressed transversely between two annular sealing surfaces on the components. The annular brush screen can conveniently be of the known construction comprising a ring and a large number of filaments projecting from the ring.

In the seal of the invention the filaments are forced against one another and against the annular sealing surfaces on the components so as to provide a filter barrier of a depth equal to a substantial proportion of the length of the filaments. Such a barrier effectively prevents passage of dirt and dust but permits a very restricted flow of air. The seal is thus particularly suitable for use with conveyor rollers in which a differential pressure across the seal occurs.

The friction torque of the seal of the invention is dependent upon the material used for the filaments. However seals with filaments made of fibre, plastics or metals can have a friction torque substantially less than that of conventional rubbing seals having the same seal to shaft interference. Moreover any wear in the seal is automatically taken up by re-alignment of the filaments.

The annular brush screen is preferably located between annular sealing surfaces on two members to form a sealing device which can be located between the two components to be sealed.

Thus according to the present invention there is also provided a sealing device for providing a seal between two relatively rotatable components, comprising two co-axial members and an annular brush screen disposed between the two members and in contact with annular sealing surfaces on the members, the filaments of the brush screen being arranged to be compressed transversely between the two annular sealing surfaces upon relative axial movement of the members towards one another.

Preferably, one of the members comprises an annular disc formed with an outer flange which surrounds the annular brush screen, and the other member comprises an annular disc formed with an inner flange which projects through the bore of the annular brush screen, the two members co-operating to form a casing which substantially encloses and protects the brush screen. The flanges on the discs may be so arranged to control the distance between the annular sealing surfaces. The two discs may be made of any suitable material, for example sheet steel or plastics.

Both the annular sealing surfaces on the two members may lie in radial planes, but preferably one of the sealing surfaces is frusto-conical and deflects the filaments of the brush screen towards the other sealing surface which may also be frusto-conical. The angle of deflection can conveniently be approximately 5 degrees.

The annular brush screen may comprise an outer ring and filaments projecting radially inwards from the inner periphery of the ring, the ring being a push fit in the bore formed by the outer flange. Alternatively, the brush screen may comprise a ring and filaments projecting radially outwards from the outer periphery of the ring, the ring being mounted on the inner flange.

In a sealing device of the invention, the annular brush screen is mounted on one of the members and rotates therewith. The filaments of the brush screen can conveniently be of a length such that their free ends make sliding contact with an annular sealing surface on the other member or on the component supporting the other member. The seal then provides both axial sealing and radial sealing.

The sealing device of the invention can conveniently be incorporated in a self-contained bearing assembly.

Thus according to the invention there is also provided a bearing assembly comprising a bearing fitted with a sealing device, in which the bearing comprises inner and outer bearing rings rotatable relative to each other by rolling elements disposed between the two rings and locating the rings axially relative to one another, the sealing device comprises two co-axial members and an annular brush screen disposed between the two members and in contact with annular sealing surfaces on the members, one of the bearing rings being mounted on one of the members of the sealing device, the other bearing ring being in abutting contact with the other member of the sealing device, and the filaments of the brush screen being compressed between the sealing surfaces of the two members.

Figure 2:
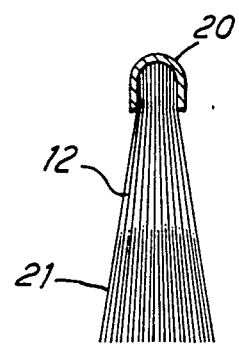
Figure 3:
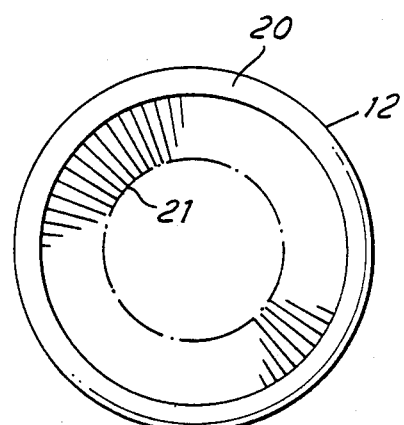
Figure 4:
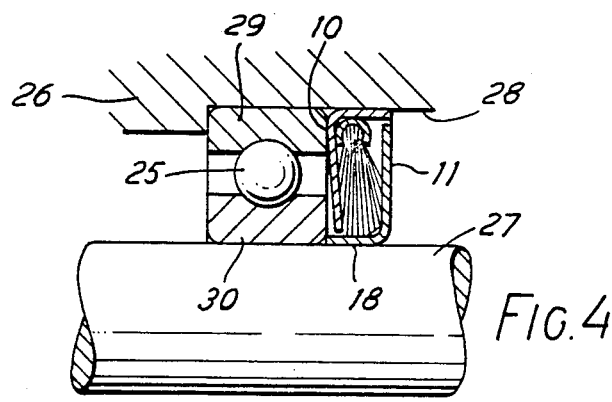
Figure 5:
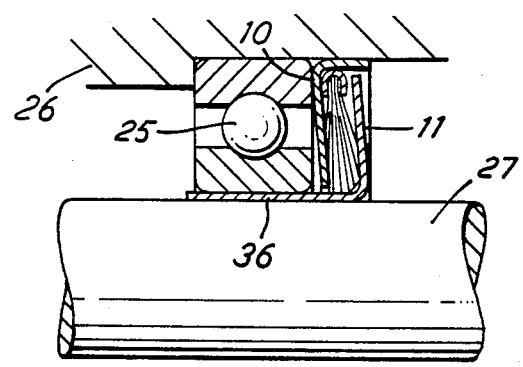
Figure 6:
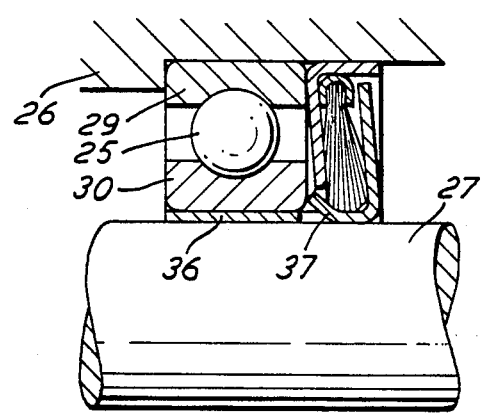
Figure 7:
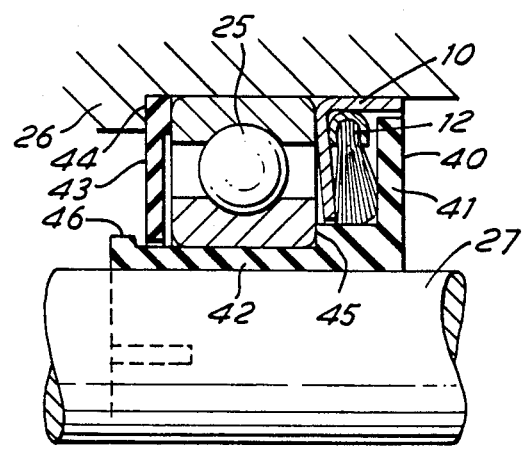
Figure 8:
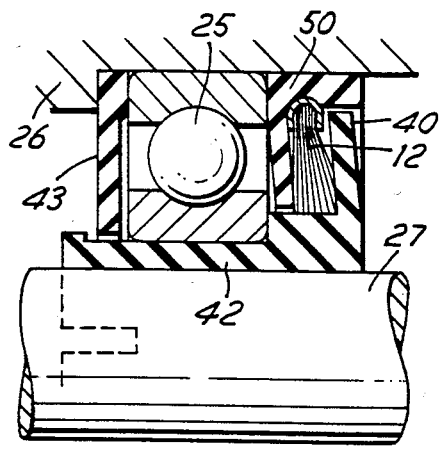
Figure 9:
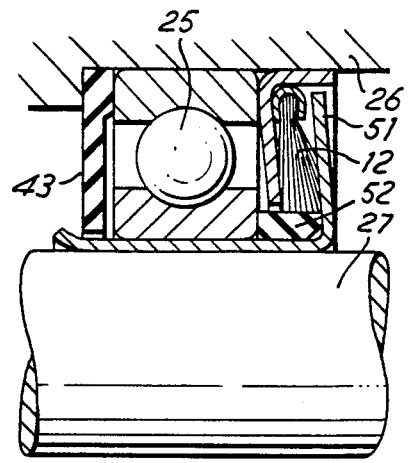
Figure 10:
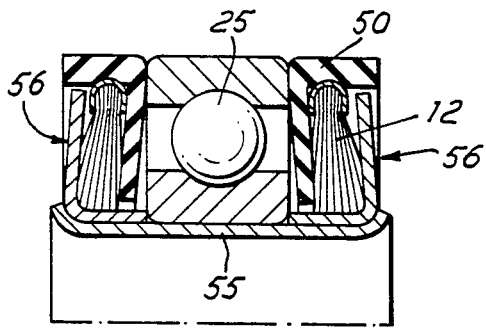
Figure 12:
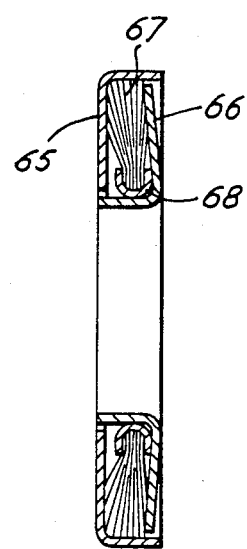
Figure 11:
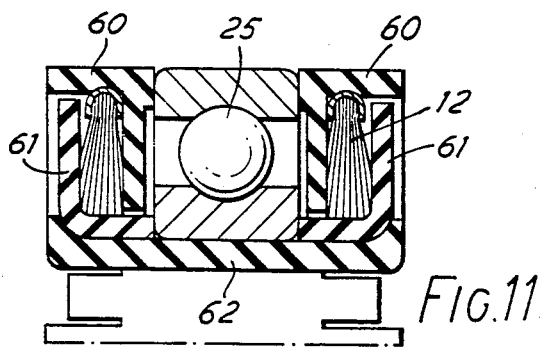

Embodiments of the invention will now be described, by way of example, with reference to the accompanying drawings, in which:

FIG. 1 is an axial cross section of a sealing device according to the invention, FIG. 2 is a view, on a larger scale, of a cross section of the annular brush screen of the sealing device of FIG. 1, FIG. 3 is a side view of the annular brush screen of the sealing device of FIG. 1, shown on a smaller scale, FIG. 4 is a sectional view through a ball bearing rotatably supporting a rotor on a shaft and provided with the sealing device of FIG. 1, FIG. 5 is a view similar to that of FIG. 4 and showing a modified construction of the sealing device fitted on the ball bearing, FIG. 6 is a view similar to that of FIG. 5 and showing another modified construction of the sealing device fitted on the ball bearing, FIG. 7 is a sectional view through a bearing assembly rotatably supporting a rotor on a shaft, the bearing assembly including a sealing device according to the invention, FIGS. 8 and 9 are views similar to FIG. 7 and showing different constructions of bearing assemblies according to the invention, FIG. 10 is a sectional view through a bearing assembly including two sealing devices arranged one on each side of the bearing, FIG. 11 is a view similar to FIG. 10 showing a modified construction of the sealing devices, and FIG. 12 is an axial cross section of another construction of sealing device according to the invention.

The sealing device shown in FIG. 1 comprises two annular co-axial members 10, 11 which co-operate to form a substantially closed casing enclosing an annular brush screen 12.

The member 10 comprises an annular frusto-conical disc 15 the outer periphery of which is formed with an annular flange 16 extending axially in the direction of the conical taper of the disc 15. The member 11 comprises a flat annular disc 17 the inner periphery of which is formed with an annular flange 18 extending axially in the direction towards the member 10. The brush screen 12 comprises an outer ring 20 of channel shaped section the trough of which faces radially inwards, and a large number of resilient flexible bristle-like filaments 21 each having one end anchored in the trough of the ring 20 and extending radially inwards. The radially outer ends of the filaments can conveniently be embedded in adhesive or plastics material in the trough of the ring 20. The outer ring 20 of the brush screen is a push fit in the bore formed by the annular flange 16 on the member 10, and the filaments 21 are of a length such that the radially inner ends of the filaments adjacent disc 15 are in contact with the radially outer surface of the flange 18. The members 10, 11 are movable towards one another in the axial direction to compress the filaments of the brush screen transversely, that is in the axial direction of the annular brush screen.

In use, the sealing device is positioned between the two relatively rotatable components to be sealed with one of the members 10, 11 mounted as a fluid tight fit on one of the components and the other member mounted as a fluid tight fit on the other component. The two members 10, 11 are arranged so that the filaments 21 are compressed between the two discs 15, 17, the frusto-conical disc 15 of the member 10 causing the filaments 21 to be deflected by approximately 5 degrees in the direction towards the flat disc 17 of the member 11. The filaments are thus pressed against each other and against the sealing surfaces formed by the inside surfaces of the two discs so as to provide in effect a labyrinth seal of many passageways of very small cross section between the filaments and extending along a major proportion of the length of the filaments. The sealing device thus provides an effective barrier against passage of dust and dirt, but nevertheless permits a very restricted flow of air through the passageways between the filaments and through the gaps between the flange 16 and disc 17 and between the flange 18 and disc 15. Upon relative rotation between the two components, the brush screen remains fast with the member 10 and the filaments slide on the sealing surface formed by the inside surface of disc 17. The member 10 and brush screen 12 may rotate and the member 11 remain fixed, or alternatively the member 11 may rotate and the member 10 together with the brush screen remain fixed.

The radially inner free ends of the filaments 21 adjacent the frusto-conical disc 15 are in sliding contact with the flange 18 and provide a radial seal therewith. Due however to the deflection of the filaments by the frusto-conical disc 15 the free ends of the filaments adjacent the disc 17 are spaced a short distance from the flange 18. Also the lengths of the filaments are such that, when the filaments are in an undeflected position prior to fitting of the brush screen in the member 10, the bore in the brush screen formed by the inner ends of the filaments is flared outwards in the direction towards the side which is adjacent the disc 17 in the sealing device, so as to ensure that the free ends of the filaments adjacent the disc 17 are spaced from the flange 18. There is thus no risk of the free ends of the filaments becoming jammed in the corner between the disc 17 and flange 18 of the member 11.

FIG. 4 shows the sealing device of FIGS. 1–3 providing a seal for a bearing 25 rotatably supporting a rotor 26 on a shaft 27. The member 10 is a push fit within the bore 28 of the rotor and abuts against the outer ring 29 of the bearing. The member 11 is a push fit on the shaft with its flange 18 abutting the inner ring 30 of the bearing. The bearing is a single-row deep-groove ball bearing in which the inner and outer rings 29, 30 are axially located relative to one another, so that the members 10, 11 which abut the rings 29, 30 are also axially located relative to one another.

FIGS. 5 and 6 show arrangements similar to that of FIG. 4 and like parts are denoted by like reference numerals. In FIG. 5 the disc portions of both members are frusto-conical, and the member 11 is formed with a longer axial flange 36 than the flange 18 shown in the sealing device of FIG. 4, the flange 36 projecting axially beyond the member 10 and projecting through the bore of the inner ring of the bearing. This arrangement has the advantage that the bearing assists in locating the member 11 on the shaft and thereby maintains the compression of the filaments. In the arrangement of FIG. 6, the flange 36 is formed with one or more tongues 37 arranged to abut the inner ring of the bearing when the member 10 abuts the outer ring, thereby regulating the degree of compression of the filaments of the brush screen.

FIGS. 7, 8 and 9 show arrangements similar to those of FIGS. 4–6 and like parts are denoted by like reference numerals. In FIG. 7 the sealing device comprises a member 10 made of sheet metal and a brush screen 12 similar to those of FIGS. 5 and 6, but the other member 40 of the sealing device is made of plastics material and comprises a flat annular disc 41 the inner periphery of which is formed with an annular flange 42 which extends through the bore of the inner ring of the bearing. The inboard side of the bearing is sealed by a plastics ring 43 which is clamped between the outer ring of the bearing and a step 44 in the bore in the rotor, the flange 42 extending through the bore in the ring 43. The flange 42 is formed with a step 45 which abuts the inner ring of the bearing, and the free end of the flange 42 is formed with a lip 46 arranged to hold together the bearing, sealing device and the ring 43 as a self-contained unit prior to fitting of the unit on the rotor and shaft.

The arrangement of FIG. 8 is similar to that of FIG. 7 except that the member 10 of the sealing device is replaced by a member 50 made of plastics material and the disc portion of member 40 is frusto-conical. The arrangement of FIG. 9 is similar to that of FIG. 8 except that the plastics member 40 of the sealing device is replaced by a member 51 of sheet metal and a plastics ring 52 is clamped between the member 51 and the inner ring of the bearing and thereby axially locates the member 51 relative to the bearing.

The bearing assembly of FIG. 10 comprises a ball bearing mounted on the centre portion of a tubular holder 55, and two sealing devices 56 arranged one on each end of the tubular holder. Each sealing device is similar to that of FIGS. 1-3 except that the member formed with the outer flange is made of plastics material and the disc-shaped portion of the member formed with the inner flange is frusto-conical. The ends of the tubular holder are flared and engage against the walls of the members formed with the inner flanges so as to hold these flanges in abutting contact with the inner ring of the bearing.

The bearing assembly of FIG. 11 is similar to that of FIG. 10, except that the two members 60, 61 of each sealing device and the tubular holder 62 are made of plastics material, and the sealing surfaces of the members lie in radial planes. The members 61 are a snap fit on the ends of the holder 62.

The sealing device of FIG. 12 comprises two annular members 65, 66 which enclose a brush screen 67 in which the filaments project radially outwards instead of radially inwards as in the sealing devices of FIGS. 1-11. The brush screen 67 comprises a ring 68 of channel shaped section the trough of which faces radially outwards, the filaments having their radially inner ends embedded in adhesive or plastics material in the trough of the ring 68.

We claim:

1. A sealing device for providing a seal between two relatively rotatable components, comprising two co-axial members and an annular brush screen disposed between the two members, wherein one of the members comprises an annular disc formed with an outer flange which surrounds the annular brush screen, the other member comprise an annular disc formed with an inner flange which projects through the bore of the annular brush screen, the two members co-operating to form a casing which substantially encloses and protects the brush screen, and each of said members is formed with an annular sealing surface in contact with the adjacent side of the brush screen, the arrangement being such that the filaments of the brush screen are compressed transversely between the two annular sealing surfaces upon relative axial movement of the members towards one another.

2. A sealing device as claimed in claim 1, wherein the brush screen comprises a ring and filaments projecting radially inwards from the inner periphery of the ring, the ring being mounted in the bore formed by the outer flange.

3. A sealing device as claimed in claim 2, wherein the bore in the brush screen formed by the inner ends of the filaments is flared radially outwards in the direction towards the disc formed with the inner flange.

4. A sealing device as claimed in claim 1, wherein the brush screen comprises a ring and filaments projecting radially outwards from the outer periphery of the ring, the ring being mounted on the inner flange.

5. A sealing device as claimed in claim 1, wherein one of the annular sealing surfaces is frusto-conical and deflects the filaments of the brush screen towards the other sealing surface.

6. A sealing device as claimed in claim 5, wherein the brush screen is mounted on a first of said members for rotation therewith, and the free ends of the filaments are in sliding contact with another annular sealing surface on the second member so as to provide both axial sealing and radial sealing between the two members.

7. A sealing device as claimed in claim 1, wherein both the annular sealing surfaces are frusto-conical.

8. A sealing device providing a seal between two components rotatable relative to one another by a bearing, the sealing device comprising two co-axial members and an annular brush screen disposed between the two members, wherein one of the members of the sealing device is fast with one of the components and the other member of the sealing device is fast with the other component, and each of said members is formed with an annular sealing surface in contact with the adjacent side of the brush screen, the two members being arranged so that the filaments of the brush screen are compressed transversely between the two annular sealing surfaces on the two members.

9. A sealing device as claimed in claim 8 in which the bearing comprises two bearing rings rotatable relative to each other by rolling elements disposed between the two rings and locating the rings axially relative to one another, wherein one of the members of the sealing device abuts one of the bearing rings, and the other member of the sealing device abuts the other bearing ring.

10. A bearing assembly comprising a bearing fitted with a sealing device, the bearing comprising inner and outer bearing rings rotatable relative to each other by rolling elements disposed between the two rings and locating the rings axially relative to one another, and the sealing device comprising two co-axial members and an annular brush screen disposed between the two members, wherein one of the bearing rings is mounted on one of the members of the sealing device, the other bearing ring is in abutting contact with the other member of the sealing device, and each of the members of the sealing device is formed with an annular sealing surface in contact with the adjacent side of the brush screen, the two members being arranged so that the filaments of the brush screen are compressed transversely between the two annular sealing surfaces on the two members.

11. A bearing assembly as claimed in claim 10, in which one of the members of the sealing device comprises an annular disc formed with an outer flange which surrounds the annular brush screen, and the other member comprises an annular disc formed with an inner flange which projects through the bore of the annular brush screen, the two members co-operating to form a casing which substantially encloses and protects the brush screen, wherein the inner bearing ring is mounted on the inner flange of the sealing device, the outer bearing ring is in abutting contact with the member having the outer flange, and the filaments of the brush screen are compressed transversely between the two annular discs of the sealing device.

12. A bearing assembly as claimed in claim 11, wherein the inner flange is formed with an abutment which abuts a side wall of the inner bearing ring.

13. A bearing assembly as claimed in claim 12, wherein a part of the inner flange is stamped out of the remainder of the flange to form said abutment.

14. A bearing assembly as claimed in claim 11, wherein the sealing device includes a ring mounted on the inner flange and clamped between the inner bearing ring and the annular disc formed with the inner flange.

15. A bearing assembly as claimed in claim 12, wherein said other member of the sealing device is formed of plastics material, and the inner flange is formed with a step which abuts a side edge of the inner bearing ring.

16. A bearing assembly comprising a bearing fitted with two sealing devices arranged one on each side of the bearing unit, the bearing comprising inner and outer bearing rings rotatable relative to each other by rolling elements between the two rings, and each sealing device comprising two co-axial members and an annular brush screen disposed between the two members, wherein one member of each sealing device comprises an annular disc formed with an outer flange which surrounds the associated annular brush screen, and the other member of each sealing device comprises an annular disc formed with an inner flange which projects through the bore of the associated brush screen, the two annular discs of each sealing device co-operating to form a casing which substantially encloses and protects the associated brush screen, and each of said discs is formed with an annular sealing surface in contact with the adjacent side of the brush screen, the annular discs formed with the outer flanges of the two sealing devices are in abutting contact with opposite sides respectively of the outer bearing ring, the inner bearing ring is mounted on the central position of a tubular holder, the inner flanges of the two sealing devices are mounted on opposite ends respectively of said holder and in abutting contact with opposite sides of the inner bearing ring, and the filaments of the brush screens are compressed transversely between the two annular sealing surfaces on the two discs of the respective sealing devices.

17. A bearing assembly as claimed in claim 16, wherein the ends of the tubular holder are splayed radially outwards and lock the inner flanges of the two sealing devices in abutting contact with opposite sides of the inner bearing ring.

18. A bearing assembly as claimed in claim 16, wherein the holder is formed of plastics material and the sealing devices are a snap fit on the ends of the holder.

* * * * *